United States Patent [19]

Isoyama et al.

[11] Patent Number: 4,696,759
[45] Date of Patent: Sep. 29, 1987

[54] ESTER COMPOUND

[75] Inventors: Toyoshiro Isoyama; Yasuyuki Goto; Tetsuya Ogawa, all of Yokohamashi; Shigeru Sugimori, Fujisawashi, all of Japan

[73] Assignee: Chisso Corporation, Osaka, Japan

[21] Appl. No.: 859,801

[22] Filed: May 5, 1986

[30] Foreign Application Priority Data

May 22, 1985 [JP] Japan ................................. 60-109599
Aug. 15, 1985 [JP] Japan ................................. 60-179708

[51] Int. Cl.$^4$ ...................... C09K 19/30; C09K 19/32; C09K 19/12; C09K 19/20; C07C 69/76
[52] U.S. Cl. ........................... 252/299.62; 252/299.5; 252/299.63; 252/299.65; 252/299.67; 350/350 R; 560/106; 560/107; 560/108; 560/109
[58] Field of Search .............. 560/106, 107, 108, 109; 252/299.63, 299.67, 299.5, 299.65; 350/350 R

[56] References Cited

U.S. PATENT DOCUMENTS

| | | | |
|---|---|---|---|
| 2,958,705 | 11/1960 | Gordon et al. ...................... | 260/476 |
| 3,915,883 | 10/1975 | Van Meter et al. ............ | 252/299.64 |
| 4,029,594 | 6/1977 | Gavrilovic et al. ............. | 252/299.65 |
| 4,065,489 | 12/1977 | Steinstrasser et al. ......... | 252/299.65 |
| 4,073,742 | 2/1978 | Erdmann et al. ............... | 252/299.65 |
| 4,229,315 | 10/1980 | Krause et al. ................... | 252/299.63 |
| 4,368,105 | 1/1983 | Osman ............................. | 252/299.63 |
| 4,400,293 | 8/1983 | Romer et al. ................... | 252/299.63 |
| 4,405,488 | 9/1983 | Sugimori et al. ............... | 252/299.63 |
| 4,487,954 | 12/1984 | Sugimori et al. ............... | 252/299.63 |
| 4,502,974 | 3/1985 | Sugimori et al. ............... | 252/299.63 |
| 4,526,704 | 7/1985 | Petrzilka et al. ............... | 252/299.64 |
| 4,542,230 | 9/1985 | Gray et al. ...................... | 252/299.67 |
| 4,548,731 | 10/1985 | Sugimori et al. ............... | 252/299.63 |

FOREIGN PATENT DOCUMENTS

| | | | |
|---|---|---|---|
| 19665 | 12/1980 | European Pat. Off. ........ | 252/299.63 |
| 49-55579 | 5/1974 | Japan ............................... | 252/299.67 |
| 57-67539 | 4/1982 | Japan ............................... | 252/299.63 |
| 58-13544 | 1/1983 | Japan ............................... | 252/299.63 |
| 58-13542 | 1/1983 | Japan ............................... | 252/299.63 |
| 58-126838 | 7/1983 | Japan ............................... | 252/299.63 |
| 58-118543 | 7/1983 | Japan ............................... | 252/299.63 |
| 58-126838 | 7/1983 | Japan ............................... | 252/299.63 |
| 58-188841 | 11/1983 | Japan ............................... | 252/299.63 |
| 58-210047 | 12/1983 | Japan ............................... | 252/299.63 |
| 59-1447 | 1/1984 | Japan ............................... | 252/299.63 |
| 59-36643 | 2/1984 | Japan ............................... | 252/299.63 |
| 59-42344 | 3/1984 | Japan ............................... | 252/299.63 |
| 59-128356 | 7/1984 | Japan ............................... | 252/299.63 |
| 59-137447 | 8/1984 | Japan ............................... | 252/299.63 |
| 2061311 | 5/1981 | United Kingdom .......... | 252/299.67 |

OTHER PUBLICATIONS

C.A. 58, 3342c (1963).
Gray, G. W., et al., Mol. Cryst. Liq. Cryst., vol. 67, No. 1-4, pp. 1-24 (1981).

*Primary Examiner*—Teddy S. Gron
*Attorney, Agent, or Firm*—Wenderoth, Lind & Ponack

[57] ABSTRACT

A novel ester compound exhibiting liquid crystal phases within a broad temperature range and having a low viscosity and a high compatibility with liquid crystal compounds, and a liquid crystal composition containing the same are provided, which ester compound is expressed by the formula

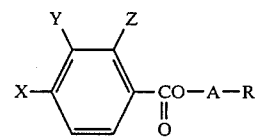

wherein X represents F or Cl; Y and Z each represent H, F or Cl and when either one of Y or Z is H, the other is F or Cl and further when X is Cl, Y and Z are not both Cl; —A— represents a member selected from the group consisting of

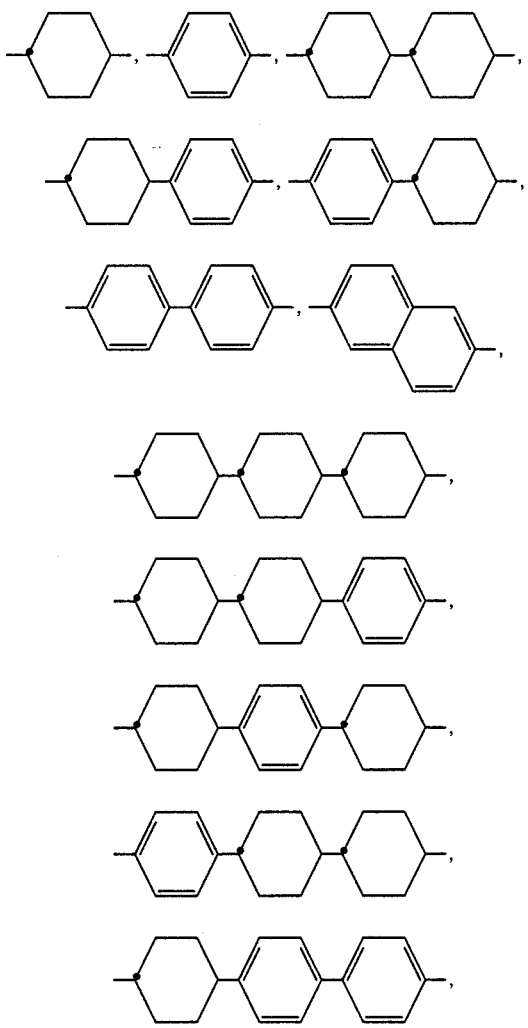

(Abstract continued on next page.)

-continued
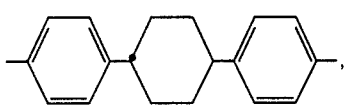
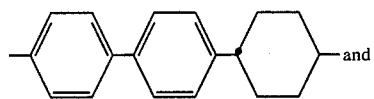 and
-continued
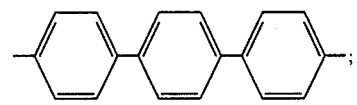
and R represents an alkyl group or an alkoxy group each of 1 to 10 carbon atoms.
6 Claims, No Drawings

ESTER COMPOUND

BACKGROUND OF THE INVENTION

1. Field of the Invention

This invention relates to a novel ester compound exhibiting liquid crystal phases within a broad temperature range and to a liquid crystal composition containing the same as an active ingredient.

2. Description of the Prior Art

Display elements utilizing liquid crystals have been broadly used for watches, electric calculators, etc. These liquid crystal display elements utilize the optical anisotropy and the dielectric anisotropy of liquid crystal substances. Liquid crystal phases include nematic liquid crystal phase, smectic liquid crystal phase, and cholesteric liquid crystal phase, and among these phases, display elements utilizing nematic liquid crystal phase have most broadly been practically used. These display elements are classified into the following types corresponding to the electrooptical effect applied to liquid crystal display elements: TN (twisted nematic) type, DS (dynamic scattering) type, guest-host type, DAP type, etc., and those which exhibit liquid crystal phases within as broad a temperature range as possible in the natural world are preferred.

At present, however, there is no single liquid crystal substance which satisfies such conditions, and mixtures of several kinds of liquid crystal substances or mixtures of the above ones with non-liquid crystalline substances have been practically used. Further, these substances have been required to be stable to moisture, light, heat, air, etc.

Still further, it has been required for the above mixtures of liquid crystal substances and the like, that is, liquid crystal compositions, that the threshold voltage and the saturation voltage for driving the compositions be as low as possible, and also the viscosity of the compositions be as low as possible in order to raise the response speed. Thus, compounds which are preferred as a component constituting the liquid crystal compositions suitable to the above object have been required. Furthermore, it has been required for the above liquid crystal compositions that the upper limit of their use temperature range, i.e., the nematic temperature range, be as high as possible, and compounds which, when added as a constituting component to the liquid crystal compounds, raise the nematic phase-isotropic liquid phase transition point (hereinafter abbreviated to N-I point) thereof without increasing their viscosity have been required.

As such compounds satisfying the above requirements, the present inventors have previously invented compounds expressed by the following formulas (II) and (III) (Japanese patent application No. Sho 57-36808/1982; Japanese patent application laid-open No. Sho 59-1447/1984), and further, compounds expressed by the following formulas (IV) and (V) (Japanese patent application No. Sho. 57-72237; Japanese patent application laid-open No. Sho 58-188841/1983) and (Japanese patent application No. Sho 57-93743/1982; Japanese patent application laid-open No. Sho 58-210047/1983):

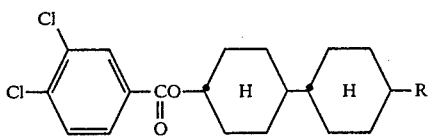

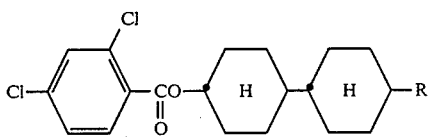

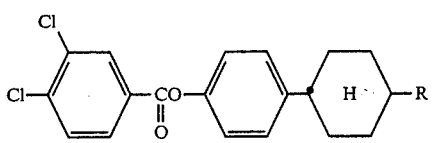

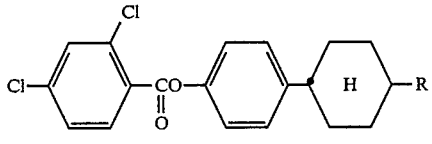

In the above formulas (II)–(V), R represents an alkyl group of 1 to 10 carbon atoms.

Further, the present inventors have invented compounds expressed by the following formulas (VI), (VII), (VIII) and (IX), as substances which are preferred for raising the upper limit of nematic temperature range among the above-mentioned objects (Japanese patent application No. Sho 57-146595/1982; Japanese patent application laid-open No. Sho 59-36643/1984), (Japanese patent application No. Sho 57-153601/1982, Japanese patent application laid-open No. Sho 59-42344/1984), (Japanese patent application No. Sho 58-3254/1983; Japanese patent application laid-open No. Sho 59-128356/1984) and (Japanese patent application No. Sho 58-11906/1983; Japanese patent application laid-open No. Sho 59-137447/1984):

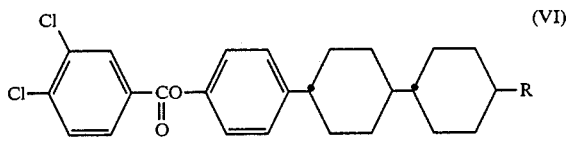

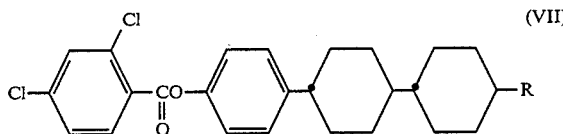

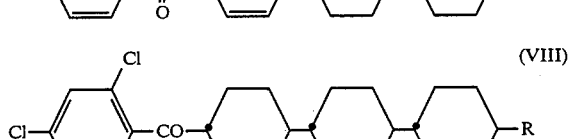

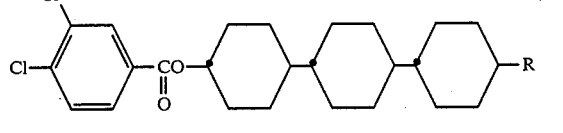

In the above formulas (VI), (VII), (VIII) and (IX), R represents a hydrogen atom or an alkyl group of 1 to 10 carbon atoms.

However, it goes without saying that liquid crystal compositions which are superior to those using the above compounds have been required.

SUMMARY OF THE INVENTION

The present inventors have made extensive research in order to obtain a compound having a lower viscosity and a higher compatibility than those of the above compounds of (II)–(IX), and as a result have found that a compound of the formula (I) described below satisfies the above requirements.

As apparent from the above description, an object of the present invention is to provide a novel compound useful for liquid crystal compositions.

Another object thereof is to provide a liquid crystal composition containing the compound.

The present invention resides in an ester compound expressed by the formula (I)

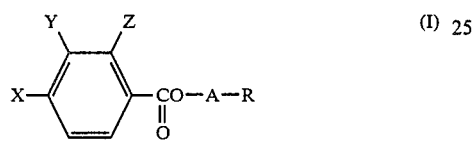

wherein X represents F or Cl; Y and Z each represent H, F or Cl and when either one of Y or Z is H, the other is F or Cl and further when X is Cl, Y and Z are not both Cl; —A— represents a member selected from the group consisting of

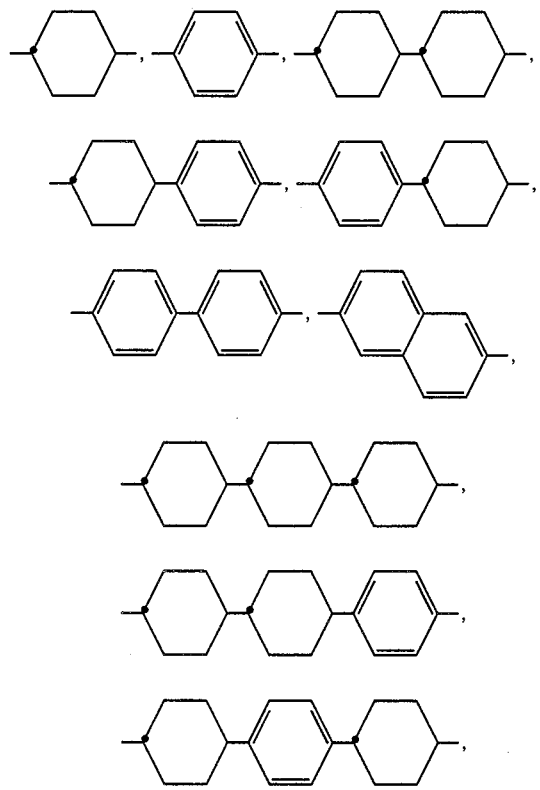

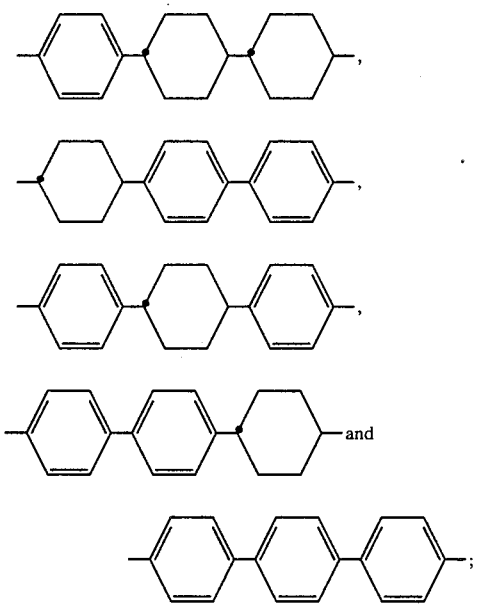

and R represents an alkyl group or an alkoxy group each of 1 to 10 carbon atoms, and a liquid crystal composition containing said compound.

DETAILED DESCRIPTION OF PREFERRED EMBODIMENTS

The compounds of the present invention will be described in more detail.

R of the formula (I) represents an alkyl group or an alkoxy group and its concrete examples are as linear chain groups, methyl, ethyl, propyl, butyl, pentyl, hexyl, heptyl, octyl, nonyl and decyl, and as branched chain groups, isopropyl, 1-methylpropyl, isobutyl, 1-methylbutyl, 2-methylbutyl, isopentyl, 1-methylpentyl, 1-ethylpentyl, 2-methylpentyl, 1-methylhexyl, 2-ethylhexyl, 1-methylheptyl, etc. Further as linear chain or branched chain alkoxy group, alkoxy groups corresponding to the above-mentioned alkyl groups may be illustrated.

An example of preparation of the compound of the present invention is expressed by the following reaction equation:

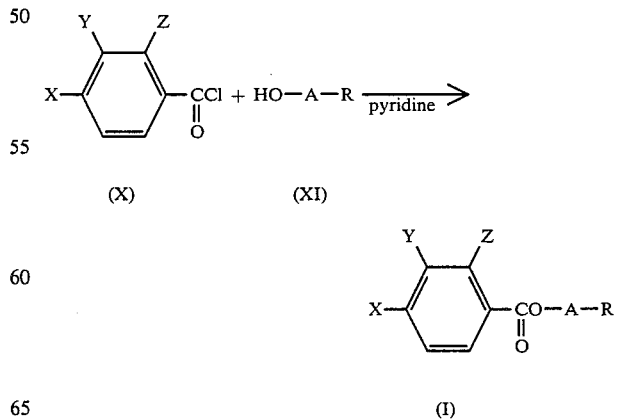

In the above equation, X, Y, Z, —A— and R are as defined above.

Namely, a 2,4- or 3,4-dihalogenobenzoyl chloride (compound (X)) is reacted with a compound (XI) having a hydroxyl group and to be subjected to dehydrochlorination-condensation, such as trans-4-methylcyclohexanol, 4-methylphenol, 6-methyl-2-naphthol, etc. in the presence of pyridine, to obtain the objective ester compound (I). More detailed, concrete preparation conditions are the same as those in the case of known, general dehydrochlorination-condensation methods.

The liquid crystal composition of the present invention is characterized by containing the ester compound of the present invention expressed by the above formula (I).

As compounds to be used as a component of the liquid crystal composition of the present invention in admixture with the compound expressed by the formula (I), a group of known compounds expressed by the following formulas (i)~(xxxiii) may be enumerated wherein X represents

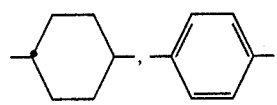

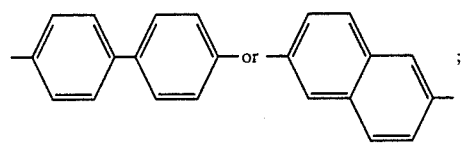

and Y represents —CN, halogen, $R^1$ or $OR^1$, and R and $R^1$ each represent an alkyl group:

 (i)

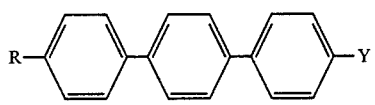 (ii)

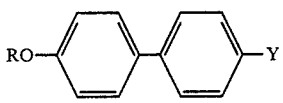 (iii)

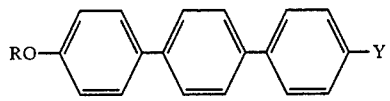 (iv)

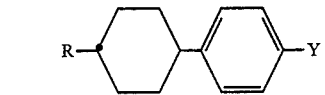 (v)

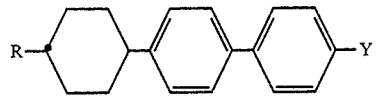 (vi)

-continued

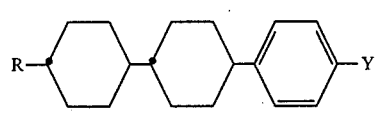 (vii)

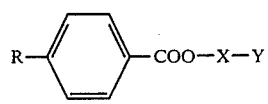 (viii)

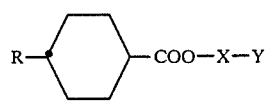 (ix)

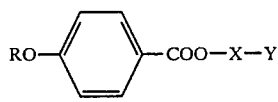 (x)

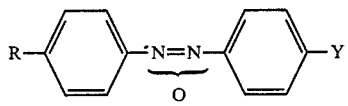 (xi)

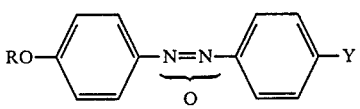 (xii)

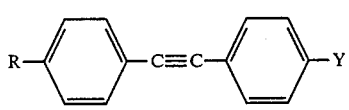 (xiii)

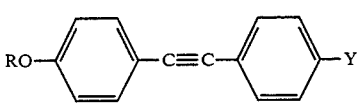 (xiv)

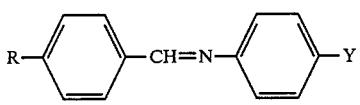 (xv)

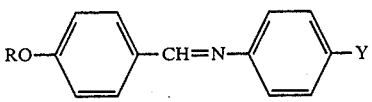 (xvi)

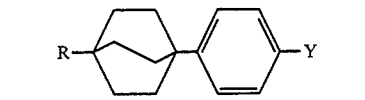 (xvii)

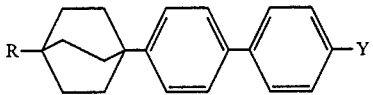 (xviii)

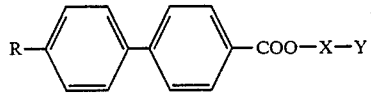 (xix)

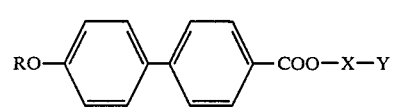 (xx)

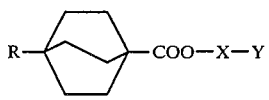 (xxi)

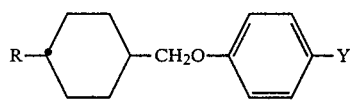 (xxii)

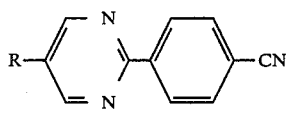 (xxiii)

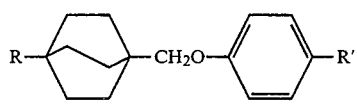 (xxiv)

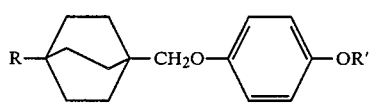 (xxv)

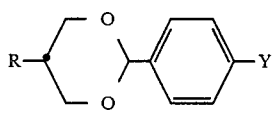 (xxvi)

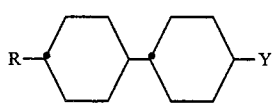 (xxvii)

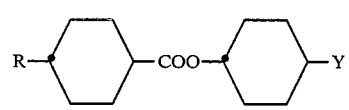 (xxviii)

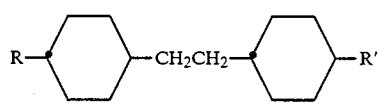 (xxix)

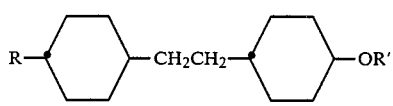 (xxx)

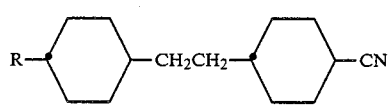 (xxxi)

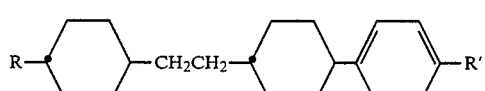 (xxxii)

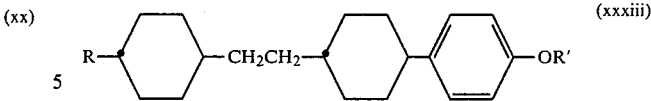 (xxxiii)

The liquid crystal composition of the present invention is prepared by blending a definite quantity of the compound of the present invention with a definite quantity of other compounds for constituting the liquid crystal composition. The blending proportion of the compound of the present invention in the composition has no particular limitation, but the proportion is generally preferred to be in the range of 1 to 30% by weight, more preferably 5 to 15% by weight based on the total weight of the composition although it varies depending on the kind of other component compounds.

A concrete composition example of the composition of the present invention is as follows:

one kind or mixtures of several kinds of trans-4-alkyl-(4-cyanophenyl)cyclohexanes, 70 to 99% by weight, preferably 85 to 95% by weight and the ester compound(s) of the present invention, 1 to 30% by weight, preferably 5 to 15% by weight.

Another composition example is as follows:

one kind or mixtures of several kinds of trans-4-alkyl-(4-cyanophenyl)cylohexanes, 60 to 84% by weight, preferably 72 to 81% by weight, one kind or mixtures of several kinds of 4-(trans-4-alkyl)cyclohexyl-4'-cyanobiphenyls, 10 to 15% by weight, preferably 12 to 15% by weight, and the ester compound(s) of the present invention, 1 to 30% by weight, preferably 5 to 15% by weight.

Further, a concrete example of one kind or mixtures of several kinds of trans-4-alkyl-(4-cyanophenyl)cyclohexanes used in the above concrete example of the composition is as follows:

trans-4-propyl-(4-cyanophenyl)cyclohexane, 20 to 35 parts by weight, trans-4-pentyl-(4-cyanophenyl)cyclohexane, 30 to 45 parts by weight and trans-4-heptyl-(4-cyanophenyl)cyclohexane, 20 to 35 parts by weight may be illustrated. Examples of the kind of the alkyl group in trans-4-alkyl-(4-cyanophenyl)cyclohexanes other than the above are methyl, hexyl, octyl, nonyl, decyl, etc.

The compound of the present invention has a good compatibility with many other liquid crystal compounds, such as those of esters, Schiff's bases, biphenyls, phenylcyclohexanes, heterocyclic compounds, etc. By adding the compound of the present invention in a small quantity to liquid crystal compounds, it is possible to raise the N-I point thereof, or it is possible to lower the driving voltage of liquid crystal display elements using the liquid crystal composition prepared by adding the compound in a small quantity.

The compound of the present invention will be described in more detail by way of Examples.

EXAMPLE 1

3,4-Difluorobenzoic acid-trans-4-pentylcyclohexyl ester

To a solution of trans-4-pentylcyclohexanol (1.9 g 0.011 mol) dissolved in dry pyridine (5 ml) was added a solution of 3,4-difluorobenzoyl chloride (2.0 g, 0.011 mol) dissolved in dry toluene (10 ml), followed by heating the mixture at 60° C. for 3 hours, thereafter pouring the reaction mixture in water (100 ml), separating the toluene layer, washing it with 6N hydrochloric acid, then with 2N-NaOH aqueous solution and further with water, drying with anhydrous sodium sulfate, distilling off toluene from the resulting toluene solution and recrystallizing the remaining oily product from ethanol to obtain the objective 3,4-difluorobenzoic acid-trans-4-pentylcyclohexyl ester (2.4 g, 0.0077 mol) (yield: 70%). This product has a m.p. of 26.9° C., and its N-I point sought from a mixture thereof with trans-4-alkyl-(4-cyanophenyl)cyclohexanes according to extrapolation method was −6.0° C. Further its elemental analysis values were as follows: C: 70.03%, H: 7.81% (calculated values, C: 69.65% and H: 7.79%).

EXAMPLES 2–14

3,4-Difluorobenzoyl chloride in Example 1 was replaced by the corresponding 3,4-dihalogenobenzoyl chlorides or 2,4-dihalogenobenzoyl chlorides, and trans-4-pentylcyclohexanol was replaced by compounds having the corresponding formula (XI), to obtain the objective compounds of the formula (I). The phase transition points and the results of elemental analysis of these compounds are shown in Table 1 together with the results of Example 1.

TABLE 1

| Example | In formula (I) X Y Z | —A— | R | Phase transition point (°C.) C | $S_B$ | $S_A$ | N | I | Results of elemental analysis (% by weight) C | H | Calculated value from rational formula (% by weight) C | H |
|---|---|---|---|---|---|---|---|---|---|---|---|---|
| 1 | F F H | -⟨⟩- | $C_5H_{11}$ | · 26.9 | | | · (−6.0)* | · | 70.03 | 7.81 | 69.65 | 7.79 |
| 2 | F F H | -⟨⟩-⟨⟩- | $C_2H_5$ | · 75.6 | | | · 129.9 | · | 71.81 | 8.59 | 71.76 | 8.58 |
| 3 | F F H | -⟨⟩-⟨⟩- | $C_5H_{11}$ | · 92.6 | · (70.5) | · (81.8) | · 147.8 | · | 74.63 | 7.26 | 74.59 | 7.30 |
| 4 | F F H | -⟨⟩-⟨⟩- | $C_3H_7$ | · 103.3 | | | · 144.5 | · | 73.91 | 6.80 | 73.72 | 6.75 |
| 5 | F F H | -⟨⟩-⟨⟩-⟨⟩- | $C_3H_7$ | · 111.0 | | · 189.5 | · 300 or more | · | 76.58 | 7.56 | 76.33 | 7.78 |
| 6 | F Cl H | -⟨⟩- | $C_5H_{11}$ | · 38.7 | | | · (−45.3)* | · | 67.59 | 5.66 | 67.40 | 5.65 |
| 7 | F Cl H | -⟨⟩-⟨⟩- | $C_4H_9$ | · 71.9 | | | · 126.3 | · | 70.63 | 8.30 | 69.94 | 8.17 |
| 8 | F Cl H | -⟨⟩-⟨⟩- | $C_5H_{11}$ | · 110.5 | | · (76.7) | · 113.7 | · | 71.48 | 6.89 | 71.54 | 7.00 |
| 9 | F H F | -⟨⟩- | $C_5H_{11}$ | · 26.1 | | | · (16.7)* | · | 70.03 | 7.72 | 69.65 | 7.79 |
| 10 | F H F | -⟨⟩-⟨⟩- | $C_7H_{15}$ | · 69.7 | | · 106.1 | · 169.4 | · | 74.35 | 9.13 | 74.25 | 9.11 |
| 11 | F H F | -⟨⟩-⟨⟩- | $C_3H_7$ | · 95.5 | | | · 162.3 | · | 73.95 | 6.74 | 73.72 | 6.75 |
| 12 | F H F | -⟨⟩-⟨⟩- | $C_5H_{11}$ | · 110.2 | | | · 156.7 | · | 75.89 | 5.41 | 75.77 | 5.83 |
| 13 | F H F | -⟨⟩-⟨⟩-⟨⟩- | $C_3H_7$ | · 100.0 | | · 226.0 | · 295.8 | · | 75.52 | 9.08 | 75.30 | 9.03 |
| 14 | F H F | -⟨⟩-⟨⟩-⟨⟩- | $C_3H_7$ | · 109.3 | | · 170.5 | · 300 or more | · | 76.46 | 7.82 | 76.33 | 7.78 |

Note:
In the column of phase transition point, C, $S_B$, $S_A$, N and I represent crystalline phase, smectic B phase, smectic A phase, nematic phase and isotropic liquid phase, respectively. The symbol · in the lower columns shows that the phase of the upper column is present, and the symbol ( ) shows monotropic transition point, and further the symbol * shows that the values were sought according to extrapolation method.

EXAMPLE 15 (APPLICATION EXAMPLE 1)

A liquid crystal blend (A) consisting of
trans-4-propyl-(4-cyanophenyl)cyclohexane
 24% by weight,
trans-4-pentyl-(4-cyanophenyl)cyclohexane
 36% by weight,
trans-4-heptyl-(4-cyanophenyl)cyclohexane
 25% by weight and
4-(trans-4-pentyl)cyclohexyl-4'-cyanobiphenyl
 15% by weight
has a N-I point of 72° C., a dielectric anisotropy value (hereinafter abbreviated to $\Delta\epsilon$) of 11.6 and a viscosity at 20° C. of 27.8 cp. There was prepared a liquid crystal cell composed of two opposed substrates each having a transparent electrode of tin oxide coated with silicon oxide and subjected to rubbing treatment, and having a distance between the electrodes of 10 μm. The above liquid crystal blend (A) was sealed in the cell and its specific values were measured at 20° C. to give a threshold voltage (hereinafter abbreviated to $V_{th}$) of 1.75 V, a saturation voltage (hereinafter abbreviated to $V_{sat}$) of 2.40 V. In this liquid crystal blend (A) (85% by weight) was dissolved 3,4-difluorobenzoic acid-trans-4-pentylcyclohexyl ester (15% by weight) prepared in Example 1. The resulting composition had a N-I point of 60.3° C., a $\Delta\epsilon$ of 11.1 and a far lowered viscosity at 20° C. of 26.9 cp. As to the characteristics of the same liquid crystal cell as above containing the above composition, the $V_{th}$ and $V_{sat}$ far lowered down to 1.66 V and 2.31 V, respectively.

EXAMPLE 16 (APPLICATION EXAMPLE 2)

A liquid crystal composition consisting of the above liquid crystal blend (A) (85% by weight) and 2,4-difluorobenzoic acid-trans-4-pentylcyclohexyl ester (15% by weight) prepared in Example 9 of the present invention had a N-I point of 63.7° C., a $\Delta\epsilon$ of 10.3 and a far reduced viscosity at 20° C. of 26.5 cp. Further, as to the characteristics of the same liquid crystal cell as above containing the above composition, the $V_{th}$ and $V_{sat}$ far lowered down to 1.70 V and 2.19 V, respectively.

EXAMPLES 17-24 (APPLICATION EXAMPLES 3-10)

A liquid crystal blend (B) consisting of
trans-4-propyl-(4-cyanophenyl)cyclohexane
 30% by weight,
trans-4-pentyl-(4-cyanophenyl)cyclohexane
 40% by weight and
trans-4-heptyl-(4-cyanophenyl)cyclohexane
 30% by weight
has a N-I point of 52.1° C., a $\Delta\epsilon$ of 11.2 and a viscosity at 20° C. of 23.4 cp.

Compositions consisting of this liquid crystal blend (B) 85% by weight) and the respective compounds of the formula (I) prepared in Examples 3, 4, 5, 7, 10, 11, 12 and 14 (15% by weight) had N-I points, $\Delta\epsilon$s and viscosities at 20° C. shown in Table 2. In any cases, N-I point rose without increasing the viscosity so much. The compositions of Example 19 and Example 24 exhibited suprisingly N-I point values of 77.4° C. and 80.1° C., respectively.

TABLE 2

| Example | Compound of formula (I) added | N-I point (°C.) | $\Delta\epsilon$ | Viscosity at 20° C. (cp) |
|---|---|---|---|---|
| 17 | Compound of Example 3 | 61.3 | 10.6 | 25.4 |
| 18 | Compound of Example 4 | 60.6 | 11.2 | 25.2 |
| 19 | Compound of Example 5 | 77.4 | 12.6 | 28.0 |
| 20 | Compound of Example 7 | 58.1 | 11.1 | 30.0 |
| 21 | Compound of Example 10 | 65.5 | 10.6 | 24.2 |
| 22 | Compound of Example 11 | 62.5 | 10.9 | 25.4 |
| 23 | Compound of Example 12 | 61.6 | 11.5 | 25.6 |
| 24 | Compound of Example 14 | 80.1 | 11.0 | 28.7 |

What we claim is:

1. An ester compound expressed by the formula

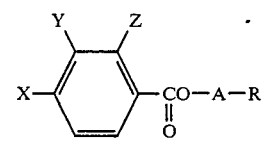

wherein X represents F; Y represents H, F or Cl; Z represents F or H, with the proviso that when Y is F or Cl, Z is H and when Z is F, Y is H; —A— represents a member selected from the group consisting of

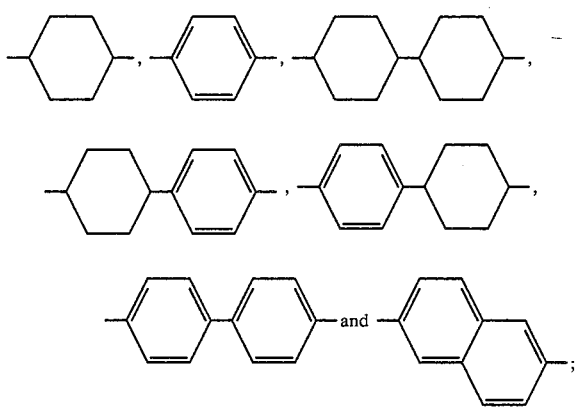

and R represents an alkyl group or an alkoxy group each of 1 to 10 carbon atoms.

2. A 3,4-dihalogenobenzoic acid ester compound according to claim 1, expressed by the formula

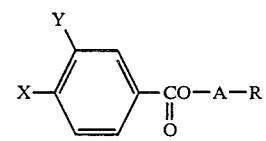

wherein X is F and Y is F or Cl; and —A— and R are each as defined in claim 1.

3. A 2,4-dihalogenobenzoic acid ester compound according to claim 1, expressed by the formula

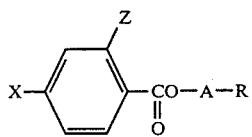
wherein X and Z each represent F; and —A— and R each are as defined above in claim 1.
4. A liquid crystal composition having at least two components at least one of which is an ester compound as set forth in claim 1.
5. An ester compound expressed by the formula
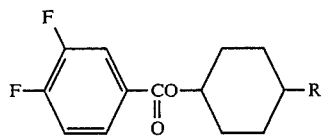
wherein R is an alkyl group of 1 to 10 carbon atoms.
6. A compound according to claim 5 wherein R is $-C_5H_{11}$.
* * * * *